(12) United States Patent
Saraf (10) Patent No.: US 10,489,284 B1
(45) Date of Patent: Nov. 26, 2019

(54) EVALUATION INFRASTRUCTURE FOR TESTING REAL-TIME CONTENT SEARCH

(71) Applicant: Twitter, Inc., San Francisco, CA (US)

(72) Inventor: Yatharth Saraf, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 141 days.

(21) Appl. No.: 15/676,984

(22) Filed: Aug. 14, 2017

Related U.S. Application Data (60) Provisional application No. 62/374,672, filed on Aug. 12, 2016.

(51) Int. Cl.
| | | |
|---|---|---|
| *G06F 11/00* | (2006.01) | |
| *G06F 11/36* | (2006.01) | |
| *G06F 16/951* | (2019.01) | |
| *G06F 8/70* | (2018.01) | |

(52) U.S. Cl.
CPC ............ *G06F 11/3692* (2013.01); *G06F 8/70* (2013.01); *G06F 11/3664* (2013.01); *G06F 11/3688* (2013.01); *G06F 16/951* (2019.01)

(58) Field of Classification Search
CPC ............. G06F 11/3664; G06F 11/3688; G06F 11/3692; G06F 8/70; G06F 8/71; G06F 16/95; G06F 16/953; G06F 16/9532; G06F 16/9538
See application file for complete search history.

(56) References Cited

U.S. PATENT DOCUMENTS

| | | | | |
|---|---|---|---|---|
| 2008/0271019 A1* | 10/2008 | Stratton | ................ | G06F 21/577 781/1 |
| 2010/0293144 A1* | 11/2010 | Bonnet | ..................... | G06F 8/63 707/640 |
| 2014/0310691 A1* | 10/2014 | Ou | ......................... | G06F 11/368 717/124 |
| 2016/0103758 A1* | 4/2016 | Zhao | ......................... | G06F 8/65 717/124 |
| 2016/0283348 A1* | 9/2016 | Golde | ................. | G06F 11/3612 |
| 2018/0308132 A1* | 10/2018 | Sharma | .............. | G06Q 30/0269 |

* cited by examiner

*Primary Examiner* — Marc Duncan
(74) *Attorney, Agent, or Firm* — Brake Hughes Bellermann LLP (57) ABSTRACT

Systems and methods provide an experimentation system, or testing engine, for a real-time search infrastructure. An example method includes generating a snapshot of a production search environment and performing testing of a signal or index change in the snapshot. The change can be specified as parameters passed to the system. The method may include estimating an impact of the change based on the testing and determining, based on the estimate, whether the impact is positive. Responsive to determining the impact is positive the method may include generating a holdback environment of the production search environment, the holdback environment being a portion of the production search environment selected not to receive the change, pushing the change to the production search environment, and monitoring the change by running partial production traffic through the holdback environment.

18 Claims, 7 Drawing Sheets

EVALUATION INFRASTRUCTURE FOR TESTING REAL-TIME CONTENT SEARCH

RELATED APPLICATION

This application is a Non-Provisional of, and claims priority to, U.S. Provisional Application No. 62/374,672, titled "Search Infrastructure For Real-Time Content," filed Aug. 12, 2016, the disclosure of which is incorporated herein by reference.

DISCLOSURE

Social media has become a source of timely information and perspectives, with social media users posting on and commenting on events as they happen. For example, Social media servers may see a spike in search traffic during major events, such as Olympic games, protests, natural disasters, etc. Searching social media has unique challenges, such as real-time expectations for searches, where results that are a few minutes old are outdated and/or irrelevant, the corpus size, which can grow by the millions daily.

SUMMARY

Implementations provide an experimentation system, or testing engine, for a real-time search infrastructure. A real-time search infrastructure provides relevant, high quality search results with low latency. A real-time search infrastructure operates on a large corpus, where hundreds of millions of new posts are added each day. Implementations include an experimentation system (e.g., testing engine) that tests changes in this real-time environment more efficiently. The experimentation system separates signal from noise by using a sandbox environment that freezes the state of the world at a given point in time. This provides an environment for stable, reproducible results for any change to be tested. In order to gain better insight, the offline experimentation system includes tooling to analyze and display differences between results. For example the system provides a platform to facilitate side by side comparison as well as crowd sourcing for the evaluation. The experimentation system may also include an interface to obtain judgment labels from in-house human raters. Another feature of disclosed implementations is the ability to validate expensive index changes, e.g. adding new index fields for retrieval, tokenization updates, etc., and refine them before deploying to the production environment. A production environment is one that interacts with clients (e.g., users) rather than an internal testing environment that is only available to developers and system administrators.

A real-time search infrastructure provides the ability to find real-time information and to provide query suggestions (e.g., type-ahead, spelling, related searches) that are also fresh and real-time. Implementations also provide a ranking system for real-time social media content, such as posts. Such a ranking system is needed because conventional link-based ranking methods, like PageRank, cannot be used for posts because posts lack the links that form the basis of such methods. Implementations also address the blending of multiple types of content that can be used as search results, including posts, other user accounts, images, videos, news articles, related searches, and spelling suggestions. The system ranks the different result types against each other in order to compose a page that best satisfies the searcher's intent. Implementations also account for personalization. In a social media search, each searcher has their own social graph, interests, location, and language preferences, and searchers expect results to fit within those parameters. Thus, implementations use these elements to ensure relevancy of search results to the user.

Implementations also include an experimentation system (e.g., testing engine) that tests changes more efficiently. The offline experimentation system separates signal from noise by using a sandbox environment that freezes the state of the world at a given point in time. This provides an environment for stable, reproducible results for any change to be tested. In order to gain better insight, the offline experimentation system includes tooling to analyze and display differences between results (e.g., from AB testing), and an interface to obtain judgment labels from in-house human raters. One particularly nice feature of the offline experimentation system is the ability to validate expensive index changes, e.g. adding new index fields for retrieval, tokenization updates, etc., and refine them before deploying to the production environment. A production environment is one that interacts with clients (e.g., users) rather than an internal testing environment that is only available to developers and system administrators.

Implementations also include an improved machine-learning pipeline. Machine learned models are commonly used for search ranking as they provide a principled and automatic way to optimize feature weights and integrate new ranking features. To make them work well, it's important to identify the right objective functions to optimize that correlate well with ultimate customer satisfaction. The system establishes a pipeline to seamlessly collect training data sets for model training and validation, and deploy trained models to production servers. The pipeline may be based on anonymized logs of past user behavior to produce positive and negative training examples. Scale brings additional challenges, e.g. the first stage of search ranking happens on index shards within a very tight loop where a large number of matching documents for a query are scored under strict CPU, memory and latency constraints. The machine-learning pipeline includes a lightweight runtime that enables running models under these constraints.

Implementations include a real-time signal ingester. The variety and timeliness of signals used by machine-learned ranking models have a huge impact on the ultimate quality of search results. Additionally, many of the signals mutate rapidly after the posts have been indexed, so the system needs to keep the signals up to date. The real-time signal ingester processes streams of raw signals and produces features for a ranking component. The real-time signal ingester includes flexible schemas for encoding and decoding new feature updates dynamically with minimum code changes and operational overhead. New signals may be added to a configuration file that specifies the location of the signal data (e.g., output from a data stream processing engine). The configuration file may also specify the encode/decode instructions, if applicable, for the signal. An indexer may use the configuration file to incorporate the signal into ranking of search results. The flexible design enables the addition and testing of new ranking signals that become available and appear promising in offline experiments.

BRIEF DESCRIPTION OF THE DRAWINGS

Like reference symbols in the various drawings indicate like elements.

DETAILED DESCRIPTION

In some implementations, a system addresses the problem of dynamically introducing new signals. Real-time search services may use many signals for different scoring/ranking processes. Introducing new signals may be difficult without a unified process for such introduction. Some of the problems may be an inflexible set-up, failure to reuse code, and the need for knowledge about the internals of a specific system to introduce new data into it. Some implementations address the use of real-time signals in scoring, ranking, and filtering results. Some implementations address evaluation of changes. Some conventional systems use an experimentation system, such as Duck Duck Goose (DDG) to run online experiments to evaluate a change to the scoring, ranking, and filtering. But such conventional experimentation systems have a long turnaround time and the results are not always easily interpretable, depending on how experiments are set up. Results are made even more difficult to interpret due to the wash-out effect, e.g., not all users in the treatment bucket get actually affected. Moreover, conventional system testing techniques fail to account for complex product features where the quality is not easily observable. Implementations provide tools to attack real-time search quality problems and keep developers from walking in the dark when trying to improve something.

Figure 1:
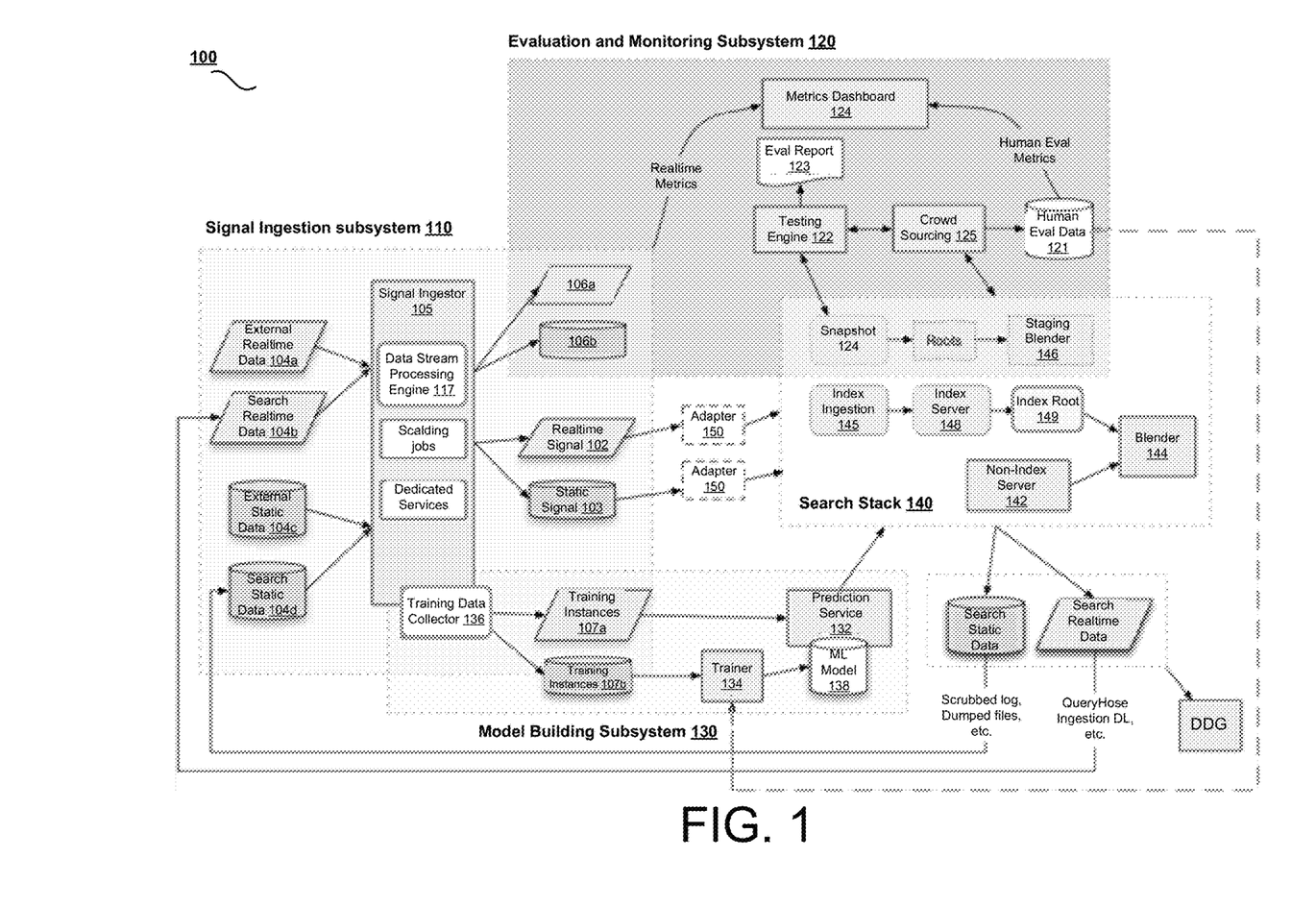
FIG. 1 is an example schematic diagram of a search quality infrastructure system, according to an implementation.

Implementations include a search quality infrastructure 100 that addresses the problems above. FIG. 1 is an example schematic diagram of a search quality infrastructure system 100, according to an implementation. For ease of explanation, the search infrastructure 100 may be descried as a search infrastructure for TWEETS but implementations are not so limited. Implementations include any search infrastructure where real-time updates of the index and reliance on real-time signals is desired. The search quality infrastructure system 100 includes a consistent search pipeline. This ensures the system has a consistent abstraction and design for the components involved across all searchable assets (e.g., TWEETS, users, media, type-ahead, etc.), namely, in query processing, signal provision, and multi-stage retrieval and scoring. The search quality infrastructure system 100 also includes unified signal ingestion subsystem 110. With the signal ingester 105, the signal ingestion subsystem 110 includes a unified way to input signals to the system 100 so they could be used at a certain search stage. To introduce new signals, developers may provide an adapter 150. The adaptor 150 can be referred to as a configuration file. In some implementations, the adaptor 150 may be a JSON configuration file. The configuration file identifies the source of the signal, e.g., signal 102 and/or signal 103 and, optionally, instructions to encode and decode the signal. The adapter 150 can be made available to any stage of search (depending on their coverage, how they are produced, and also limited by practicality and cost). The signal ingester 105 may support both real-time and static signals, regardless their source, produce intermediate signal products for reusing, and provide a signal catalog listing all available signals.

The search quality infrastructure may also include an Evaluation and Monitoring subsystem 120 to test changes in search quality. The evaluation and monitoring subsystem 120 may provide common practice guidelines to implement a change, to instrument the monitor, and to run offline evaluations and online (live) experiments. In some implementations, the evaluation and experimentation component includes an offline evaluation report 123 or an online user interface that is based on side-by-side (SxS or AB) testing, offline evaluation based on crowdsourcing, and/or online evaluation based on DDG. The evaluation and experimentation component may also include metric dashboards 124. The metric dashboards 124 monitor the quality of the search results, based on both collected logs and human evaluation data 121. The metric dashboards 124 may also monitor newly added features.

In the example of FIG. 1, the search quality infrastructure system 100 includes four subsystems. One subsystem is the Search Stack subsystem 140. The search stack subsystem 140 is the search pipeline, which is illustrated as a simplified connection, with a generic Index Ingestion 145, Index Server 148, a Non-index Server 142, and Blender 144. Implementations may also include a parallel test stack with static index and staging Blender 146. Another subsystem is Signal Ingestion Subsystem 110. The Signal Ingestion Subsystem 110 includes a set of servers and jobs that produces signals, e.g., signals 102 and signals 103, to be used in search. The Signal Ingestion Subsystem 110 takes a plurality of real-time/static inputs, e.g., items 104a, 104b, 104c, and 104d, and processes them into another set of signals, e.g., real-time signals 102 and static signals 103. In the example of FIG. 1, signal outputs of the Signal Ingestion Subsystem 110 go into a corresponding Adapter 150 to get in a specific search pipeline component, depending on the pipeline's ability to consume signals. The Signal Ingestion Subsystem 110 may also produce non-signal products like real-time metrics 106a and static metrics 106b and training data, such as real-time training instances 107a and static training instances 107b. These non-signal products may share the inputs or intermediate outputs of Signal Ingestion Subsystem 110.

Another subsystem included in system 100 is an Evaluation and Monitoring subsystem 120. The Evaluation and Monitoring Subsystem 120 evaluates changes and monitors quality metrics. The Evaluation and Monitoring Subsystem 120 may include a crowd sourcing component 125 that provides a human evaluation platform/engine, running multiple evaluation workflows. The Evaluation and Monitoring Subsystem 120 may also include an offline testing engine 122 that runs multiple configurations of a change on a snapshot 124 (maybe with a static index, depending on availability), produces Evaluation reports 123, e.g., Side-by-Side (SxS) or AB testing reports. The snapshot 124 may include a partial capture of production data, e.g., the last 3 days, the last 7 days, the last 9 days, etc. In some implementations, the system may store a number of different snapshots 124, e.g., snapshots taken at different times. The offline testing engine 122 can also send results to the crowd sourcing component 125 to get ratings and compute quality metrics (like NDCG score) for different configurations for fast evaluation. The Evaluation and Monitoring Subsystem 120 may also include Metrics Dashboards 124. The dashboards 124 display metrics. The source of the data displayed by dashboards 124 may be from human evaluation outputs from the Crowd Sourcing component 125, computed from scribe logs, and even computed from real-time streams, e.g., real-time metrics 106a and/or static metrics 106b.

The search quality infrastructure system 100 may also include a model building subsystem 130. The model building subsystem 130 enables the search quality infrastructure system to move many of the scoring components to machine-learning based models, such as model 138. The model building subsystem 130 collects training instances from logs and real-time streams, runs trainer jobs 134, and publishes trained models 138 either in static files or through a Prediction Service 132. The model building subsystem 130 can also build real-time models 138 in the Prediction Service 132 when it receives a stream of real-time training labels, e.g., training instances 107a. In some implementations, models 138 are exposed to the Search Stack subsystem 140 either through model loader calls or Prediction Service 132 calls.

The Search Stack Subsystem

A simple search pipeline has three steps: retrieval, scoring and filtering. The retrieval step obtains the documents from a data source. For a minimalistic search engine, this may be the only step needed. Document selection may be based on the query, and a powerful query language can provide quite flexible ways to retrieve documents, using the meta information in the data source. While the real-time quality search infrastructure system 100 retrieves the documents (e.g., TWEETS, web-pages, videos), it may also retrieve documents' payloads, which are signals the system 100 can use in the next steps. Retrieval could be from any data source available. Moreover, retrieval could insert manually prepared documents, or extract from the results of other searches running in parallel (e.g. user search can use @mentions extracted from TWEET search results).

Scoring calculates a ranking score for the retrieved documents if they need to be ranked in a certain way. Scoring needs signals, which can be provided along with the retrieval step above or looked up from other data sources or services. Whether ranking signals are provided during the retrieval step or obtained from other data sources/service may be dependent on the location of the scoring stage. Filtering reorders or drops some of the retrieved documents, depending on the score, the request context, and other system requirements.

Figure 2:
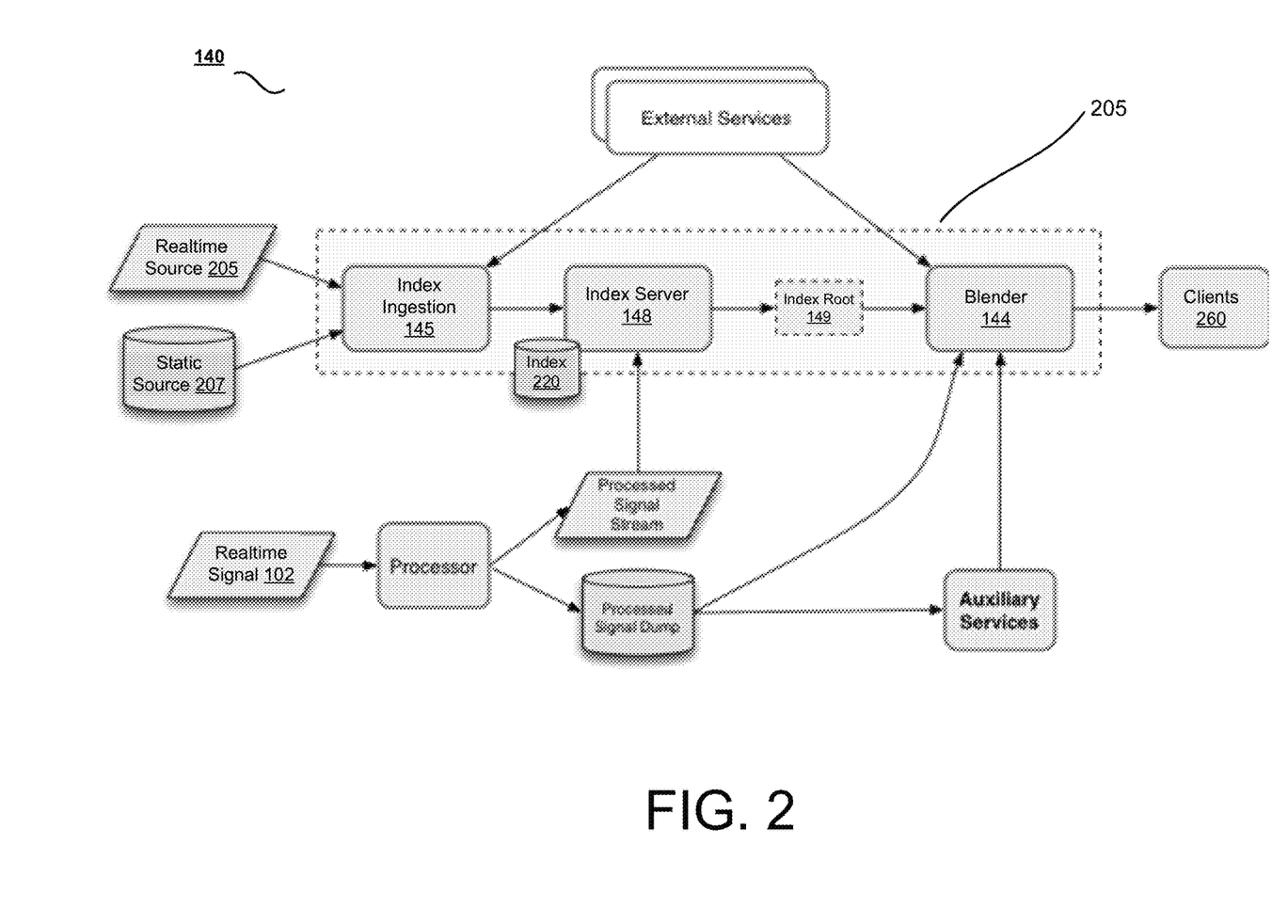
FIG. 2 is a schematic diagram of an example search stack subsystem for single index, according to an implementation.

In a real-time search system one round of retrieval, scoring, and filtering may not provide sufficient results/data, as documents could be provided from different sources, and the cost to acquire different kinds of signals can vary. Thus, the search stack subsystem may include multiple stages of retrieval-scoring-filtering (RSF) in the pipeline. Some stages may be missing in a certain step, like one stage may not have any retrieval, only scoring and filtering with extra information. In some implementations, a first stage may be an initial retrieval and basic scoring, using the information stored in the index. Because the system iterates through many documents at this stage, the scoring may be lightweight and, thus, uses a small signal set during the scoring. A second stage and later stages, e.g., in Blender, may do more retrieval, and use more signals from many external services in ranking. FIG. 2 is a schematic diagram of an example search stack subsystem for single index, according to an implementation.

In the example of FIG. 2, the components in box 205 wrap multiple RSF stages. For example, the index ingestion process 145, may receive documents from a real-time document source 205 or static document source 207, process them, optionally pair them with data from external data sources, and build an index 220 for the documents. In some implementations, the index server 148 may build the index 220. The index server 148 loads the index 220, and provides the raw search results, which is RSF Stage 1. A search may be processed through a scatter-and-gather Index Root server 149. In the example of FIG. 2, the blender 144 does a final round of processing (e.g., RSF stages 2, 3, 4, etc.) of the returned results and hydrates them before sending them back to the clients 260.

Figure 3:
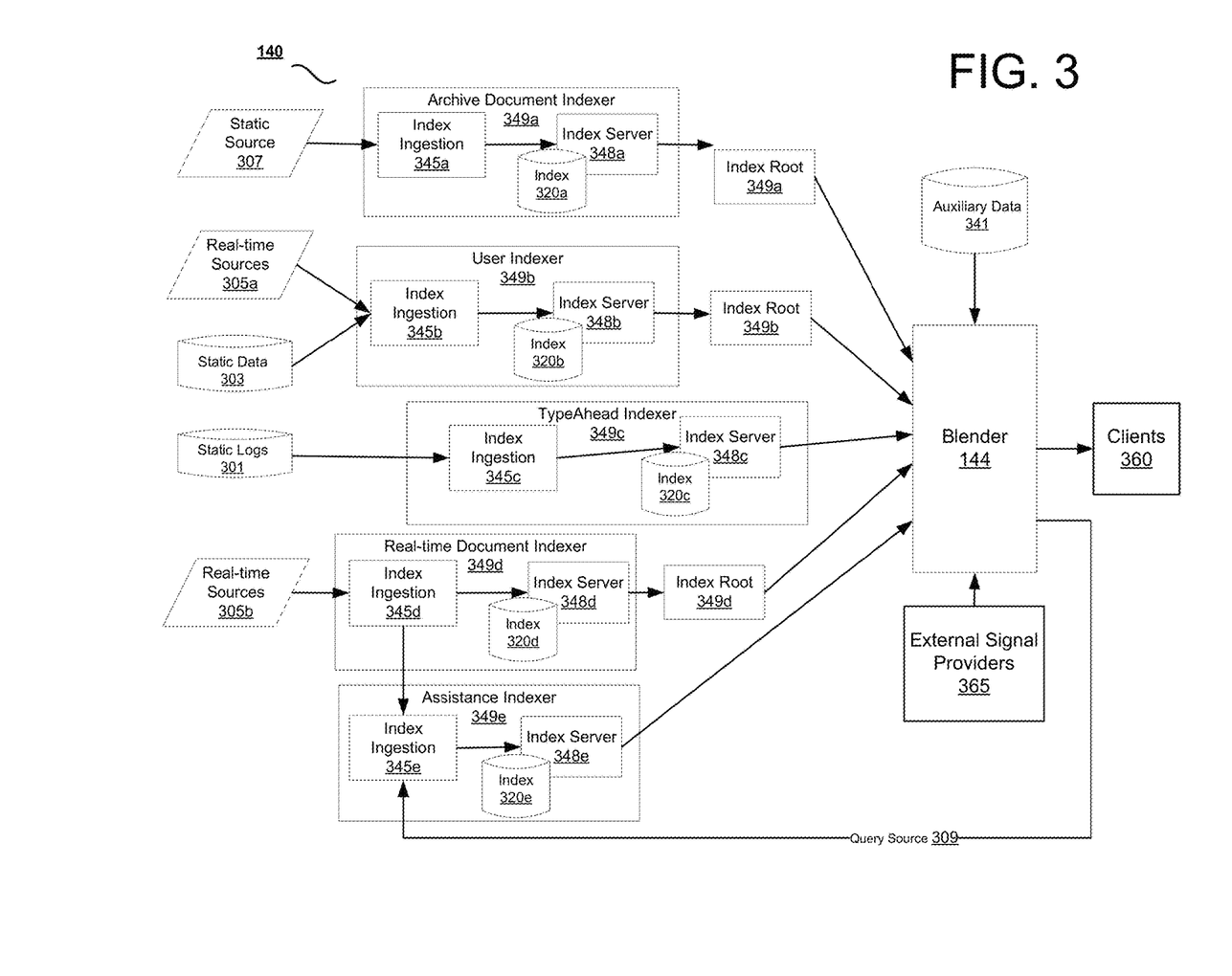
FIG. 3 is a schematic diagram of another example search stack subsystem with multiple copies of the pipeline.

FIG. 3 is a schematic diagram of another example search stack subsystem 140 with multiple copies of the search pipeline. In the example of FIG. 3, the search is centered on Blender 144, which is supported by multiple services. In FIG. 3, components in gray boxes are where the search retrieval and scoring happens, e.g., in various index ingestion processes 345a, 345b, 345c, 345d. Each index ingestion process 345 processes a different input. For example, index ingestion process 345a may receive documents from static document source 307. For example, static source 307 may include documents that are not coming in the form of a stream. Such posts may be referred to as archive documents, while documents coming in a stream may be referred to as real-time documents. The index ingestion process 345a may process the documents and build an index 320a for the documents. In some implementations, the index server 348a may build the index 220a. The index 320a may thus represent a first type of result, e.g., older social media posts. The index server 348a loads the index 320a and provides the raw search results from this index, which can be processed by scatter-and-gather index root 349a.

In a similar manner, index ingestion process 345b may receive documents from real-time source 305a in addition to documents from static data 303. For example, the real-time source 305a may be real-time updates for a social graph and static data 303 may be user data. The index ingestion process 345b may process the documents, and optionally pair them with data from other external data sources. The index ingestion 345b may build an index 320b for these documents. In some implementations, the index server 348b may build the index 220b. The index 320b may thus represent a second type of result, e.g., social media platform users. The index server 348a provides the raw search results, which can be processed by scatter-and-gather index root 349a.

Index ingestion process 345c may receive data from anonymized logs 301. The logs 301 may be search logs with user information removed. The index ingestion process 345c may process the data and, in some implementations, may pair them with data from other external data sources. The index ingestion process 345c may build an index 320c for the data. The index 320c represents a third type of search result, e.g. recent query information, which can be used to auto-complete queries or may query suggestions. The index server 348c may read the index 320c and provide the raw search results to the blender 144.

Index ingestion process 345d may receive documents from real-time sources 305b. Real-time sources 305b may be recent, e.g., real-time documents, e.g., social media posts, blogs, or news articles. The index ingestion process 345d may process these documents and optionally pair them with data from other external data sources. The index ingestion 345d may build an index 320d for these documents. The index 320d represents a third type of document, e.g. fresh or recent posts. The index server 348d may read the index 320d and provide the raw search results, which can be processed by scatter-and-gather index root 349d.

Index ingestion process 345e may be a statistics collector, which receives information from the index ingestion process 345d and a query source 309, which includes data about the queries processed by the blender 144. Thus, index ingestion process 345e may process the data and generate index 320e. The index 320e represents a third type of search result for the blender 144, which may be considered by the blender 144.

In the example of FIG. 3, the real-time sources feed a special purpose service and may be refreshed every few seconds or minutes. Static sources represent non-real-time sources, which may be processed periodically, such as once a day. The index ingestion processes 345 for non-real-time sources may be batch jobs, e.g., scalding jobs. External signal providers 365 may include services Blender 144 looks up to get extra information about search results. There may be many different types of external signal providers. The blender 144 provides hydrated search result to clients 360.

In the example of FIG. 3, the table below illustrates example social media sources, indices, and signals for scoring/filtering step for different search features in a social media environment. The search may be done by running multiple RSF pipelines.

TABLE 1

| Search Features | Retrieval | Scoring/Filter |
|---|---|---|
| TWEET Search (including news) | TWEET search with index 320a and 320d | index signals reranking, filtering TWEET signals URL signals |
| News/Media Search | facet search with index 320a and 320d | TWEET count and author signals URL signals native image signals |
| User Search | Index 320b | User Index Blender Document Index filtering |
| Type-Ahead Topics | Index 320c | language signals |

In some implementations, the system may search with a serialized query with annotations, and convert it to a query tree with index specific knowledge. Conventionally, the terms and phrases are converted into a disjunction with all searchable fields, and operators are converted to special query nodes that either look up an internal term or run a special filter. A scorer may appear as a wrapping "scoring query" on top of a "retrieval query" which finds the document matching the query. The scoring query looks up all features for the scoring function to be used in the scoring function. This generally works well, but there are several problems. For example, some query trees themselves partially define the scoring function. This part is hardcoded and very hard to tune, yet it has great impact on the final score. Ideally the query acts as a feature collection process, and a final scorer handles all features. As another example, not all features may be available in the scorer.

Model Building

To avoid manual tuning and allow continuous improvements, the system may include a model building subsystem that uses machine learned scorers in at least some RSF stages. The model building subsystem may enable introduction of new signals in a more scalable way.

Figure 4:
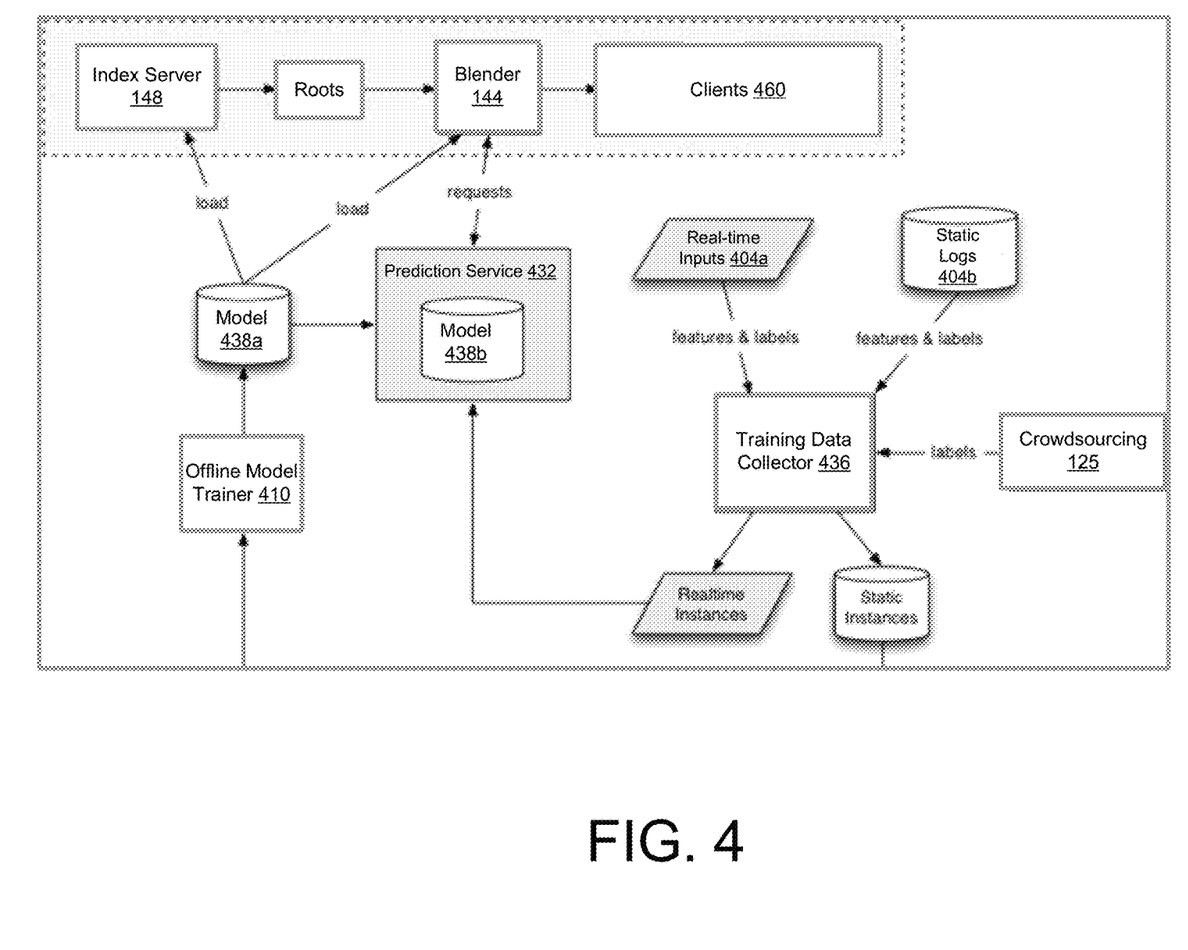
FIG. 4 is a schematic diagram that illustrates an example model building subsystem, according to an implementation.

FIG. 4 is a schematic diagram that illustrates an example model building subsystem 130, according to an implementation. In general, a machine-learned model operates on an interconnected group of nodes, each node representing an artificial neuron. The nodes are connected to each other in layers, with the output of one layer becoming the input of a next layer. The model transforms an input, sometimes referred to as a set of features. The model receives input in the input layer, transforms the input through a series of hidden layers and produces an output via the output layer. Each layer is made up of a subset of the set of nodes. During training (e.g., training mode), each node tries to find the optimal value for weights in an objective function that results in the correct or optimal output. For example, given input x the model learns which weights provide the correct answer y. Nodes in the output layer provide the transformed input to the requesting process.

The machine-learned model can be trained either online or offline. In offline training a model is trained periodically via offline model trainer 410. The model 438a may then be published. Once published, the model may be loaded either directly by the service that uses it or by a general Prediction Service 432 which serves the model, depending on the size of feature set and the size of model. The latter setup is useful when the feature set size is moderate and the model itself is big, like one with thousands of sparse features, or when separation of the maintenance of the model 438a from production server is desired. The server will simply call Prediction Service 432 with an extracted feature vector as input for the model to get a score/classification back as the output. Online trained models, such as model 438b, are updated in real time. With online trained model 438b, the Prediction Service 432 supports taking in training labels and updating the model 438b in real-time. This means the system prepares the training labels in real-time as well and provides the training set as a stream. The system may use multiple models for a single scoring function, each optimizing for a simpler goal. The system may test updates to the model 438a or model 438b using the testing engine, as described herein.

The model building subsystem 130 may include a training data collector 436. The training data collector 436 may be similar to the training data collector 136 of FIG. 1. The training data collector 436 may prepare the training data for online model 438b and offline model 438a. The training data collector 436 may be a collection of jobs running on real-time inputs 404a and static inputs 404b that constructs training instances. Training labels could be from multiple sources. For example, the training labels may be extracted from static logs 404b. The system may determine user's reaction to previously displayed results by looking at log events. For example, the system may look at RETWEET events on media gallery TWEETS to see if a user has engaged with it or not. If the user engages with a result it may be labeled as a positive example for use in a media gallery scoring model training. As another example, the system may use a crowd-sourcing system to collect human evaluation labels on a given set of entries. Such crowdsourcing may be useful for new features. Human evaluation labels may also be collected in real-time, if the system generates the evaluation tasks in real-time.

Another part of the training instances are features (signals), a model is a function of all features, and the features have to be present at the model serving time and training time. The training time features are usually collected from sources such as static logs. For example, a server may output features of results in the response and scribe them to a log and the model building subsystem may process the log later.

Signal Ingestion

Signals may be introduced into the system at very different points. For example, some signals may be introduced at indexing time. Signals introduced at indexing time may be anything that exists at the time a document is indexed, it could be either computed from the document data itself, or looked up from another service. Some signals may be introduced in real-time, or in other words at index update time. Some indices support real-time update to some per-document information and some signals may be introduced with the update. Some signals may be introduced at search time. For example, the system (e.g., Blender 144) may look up information for documents (e.g., TWEETS) and users from external services at query time. Some signals may be asynchronous. These signals are not used during the search, but supplied at a different time.

Figure 5:
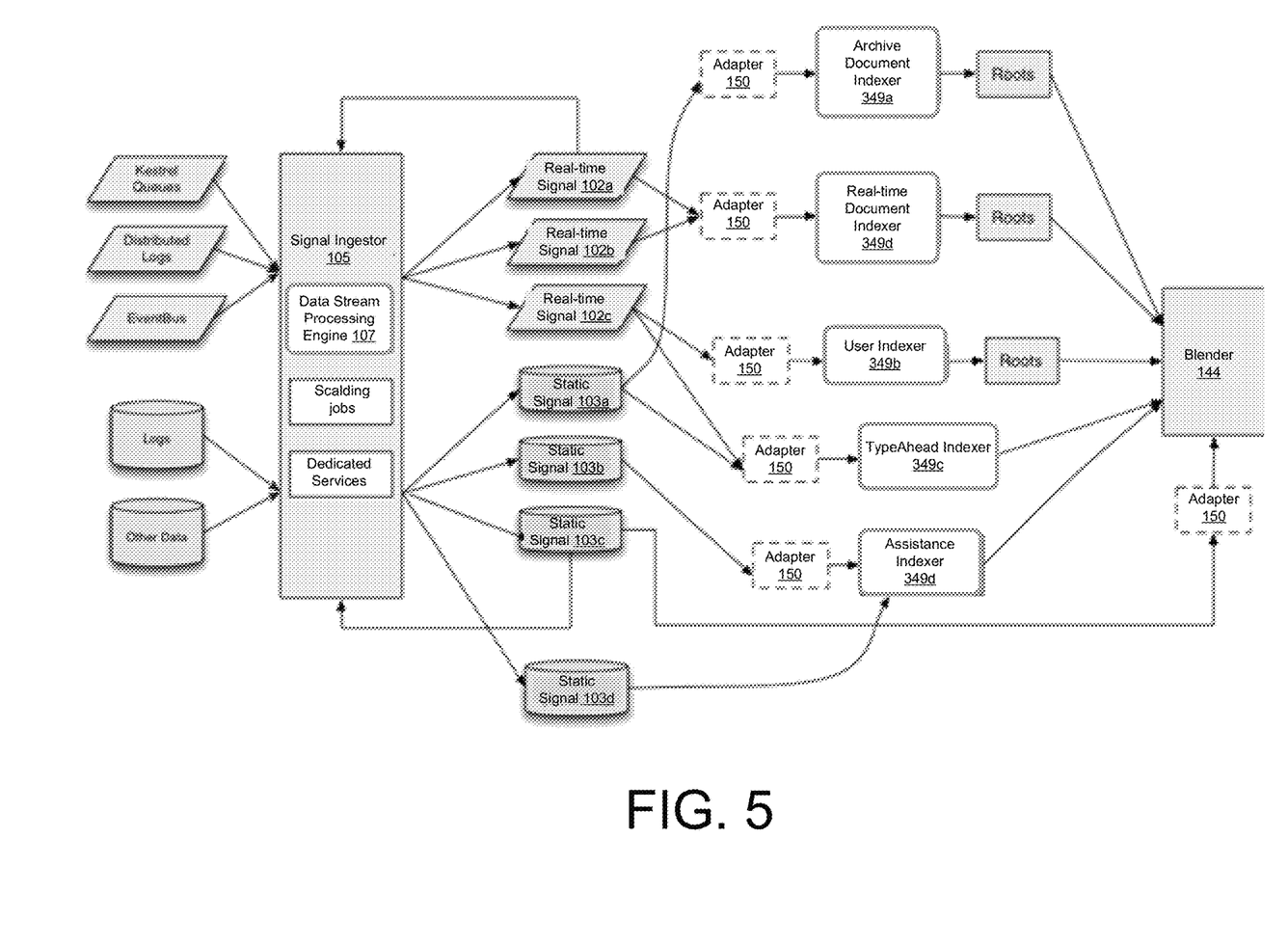
FIG. 5 illustrates a schematic diagram of a unified signal ingestion subsystem, in accordance with some implementations.

FIG. 5 illustrates a schematic diagram of a unified signal ingestion subsystem 110, in accordance with some implementations. The signal ingestion subsystem 110 may handle all signal processing. The signal ingestion subsystem 110 may not be a single server or job, but can be a collection of services and jobs that converts raw input signals to a set of signal products that can be easily consumed by various stages of search. The products may be considered a graph of signals.

The signal ingester subsystem 110 may support two general types of inputs: real-time input and static input. Real-time input is anything coming in the form of a stream, it could be from any streaming/queueing service, distributed logs (indexer output), etc. If a potential real-time data source is not yet in a known form, it could be converted into a known form with an adapter. Static input is data from a static storage, like HDFS. The static input could be further processed by scalding jobs or other dedicated services. In addition, some data may not be stored on disk, but stored in a higher level storage service.

Input data may be processed by a graph of data stream processing engine jobs 117 (for streams), scalding jobs (for HDFS data, etc.), or dedicated services. The signal ingester subsystem 110 may output signal products in various forms, depending on the usage. The signal ingester subsystem 110 may compile a catalog (maybe automatically) of all output signals to promote their reuse.

In some implementations, outputted signals may not be directly usable by the index server 148 or Blender 144 and may need to be adapted. Accordingly, the signal ingester subsystem 110 may include adaptors 150. For example, real-time signal, per-doc numeric values may be read from the stream and encoded or otherwise converted before providing to the indexer. In some implementations, the indexer may allocate space for every document for this signal, regardless of whether it has a value or not. In some implementations, the indexer may only allocate space for a signal when the document has a value for the signal. If an indexer component only takes static signals as input, in some implementations the signal ingester 105 may convert real-time signals into static signals, e.g. by periodically storing the real-time signals in disk or flash memory. In some implementations, if an index component only takes real-time signals, the signal ingester 105 may pipe the static signals into a stream (e.g., one-off or batches) to make them appear real-time. The system may use component-specific logic for storage and serving these signals via adaptors.

Evaluation and Monitoring

Returning to FIG. 1, implementations may include an evaluation and monitoring subsystem 120 that enables experimentation with a new signal. The ingestion may be the same as other signals, e.g., adding necessary jobs in the Signal Ingester 105 to process signals into a proper form, whether real-time or static. However, some servers, especially index servers are hard to change and deploy. Accordingly, the system may include a testing engine that can determine the effects of a new signal, or the effects of different weights on a model, etc.

As one example, the indexer (e.g., a document indexer or user indexer, etc.) may support a few integer worth of signals per document that can be updated in real-time, by reading a feature update queue from an updater. To add new signals without having to redeploy the indexer, the system may set aside some free bits for future/experimental usage or allow the incoming stream to specify signals with a storage hint for Adapter 150. In some implementations, the system may specify the signal by name, so the indexer may periodically load some signals schema from a shared place (HDFS, etc.) so it knows how to store the signals. In some implementations, the system may also specify the signal by name and storage directives (like bitmask), so the indexer knows how to store them and how the scorer can retrieve them.

Figure 6:
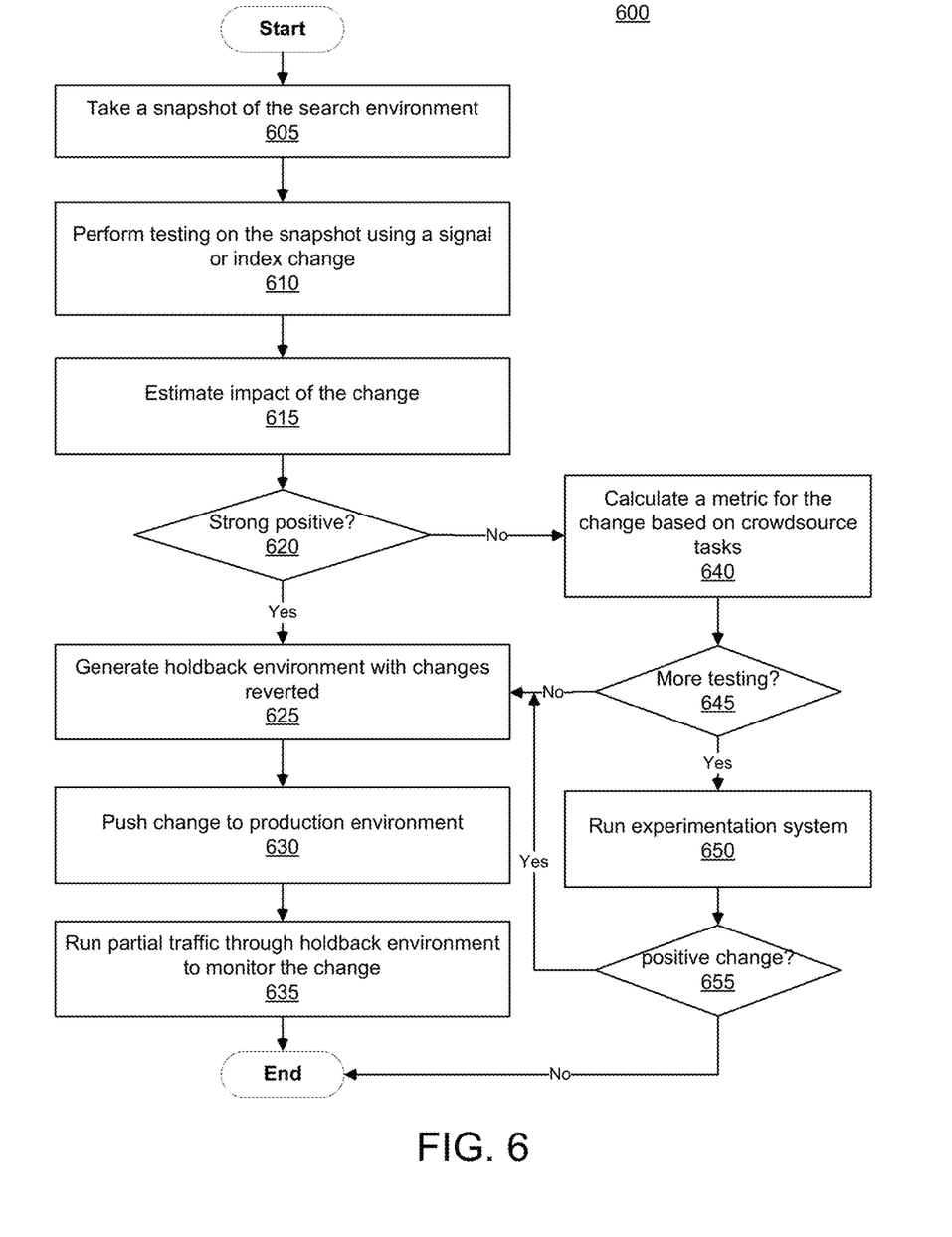
FIG. 6 illustrates a flow diagram of a process for introducing an index or signal change, in accordance with some implementations.

FIG. 6 illustrates a flow diagram of a process 600 for introducing an index or signal change, in accordance with some implementations. The process of FIG. 6 may be performed by an evaluation and monitoring subsystem, such as evaluation and monitoring subsystem 120 of FIG. 1, in a real-time search system. Process 600 enables the system to evaluate new features and changes to prediction models quickly, but in a sandboxed environment. Thus, process 600 enables the search system to safely but efficiently evaluate changes to the signals used to provide search results.

Process 600 may begin by taking a snapshot of the search environment (605). The snapshot enables the system to freeze the state of the world at a given point in time. This provides an environment for stable, reproducible results for any change to be tested. Without the snapshot the real-time environment of the search system may change too rapidly to produce reproducible results. The snapshot may include a partial capture of production data, e.g., the last 3 days, the last 7 days, the last 9 days, etc. In some implementations, the snapshot may be generated from distributed logs. In some implementations, the distributed logs may include information for indexing events, e.g., a new document (e.g., TWEET), an engagement for a document (e.g., RETWEET or a like), a new user, etc. In some implementations, the distributed logs include a sample set of the real-time data, e.g., every nth update may be included in the logs. In some implementations, the snapshot may include index data from one or more indices, e.g., a document index, a user index, etc. In some implementations, the snapshot may include the source information that the index is based on, e.g., may include documents and the document index. In some implementations, the snapshot may include information about queries that are contemporaneous, e.g., queries for the past 3 days. In some implementations, the snapshot may include updates, e.g., feature updates or status updates.

In some implementations, the system may have previously generated the snapshot, e.g., for testing a different change. In some implementations, part of the snapshot may be generated periodically, e.g. every 6 hours, every day, etc. For example, the system may generate snapshot data of some data, e.g., a user index, periodically because this data does not change as rapidly. In some implementations, the system may generate a snapshot of other data, such as TWEET updates, feature updates, and TWEET status updates, on demand. In some implementations, the system may generate and store multiple snapshots.

The change being tested may be a signal change. The signal change may be a change to an existing signal or addition of a new signal. The change being tested may also be a change to an index, e.g., adding a new index field for retrieval, tokenization updates, etc. When a new index field is added, the system may take as input a file that maps data in the document to the new field and generate a new index for the snapshot. Therefore, in some implementations, generating the snapshot may include extracting the information from the document according to the map and adding the new fields to an index generated as part of generating the snapshot. In short, the snapshot may capture any type of data stored by the system used to generate a recommendation or search result.

In some implementations, process 600 may include a pre-implementation step (not illustrated). The pre-implementation step may include examining the new data to determine whether it is valid. If the data is human readable (rather than just abstract numbers), this may include doing a spot check or running a quick human evaluation to verify its quality. This step is optional.

The system may perform testing of the proposed change (610). In some implementations, the system may test with at least 200 examples of change. The examples may be queries to generate results for. In some implementations, the examples may be uploaded as sets, e.g., query sets. In some implementations, the system may obtain testing parameters, for the change, e.g., from a command line, user interface, or a file. The testing parameters may specify particular signals or combination of signals to test, e.g., in the staging blender 146. In some implementations, a user may specify different buckets with distinct parameters. The system may generate search results for each bucket for each query set. If the feature is an improvement to an old feature, the testing engine may run a side-by-side (SxS) or A/B test over a random input. This may be a random query set, but it could be more targeted if the change is known to apply to certain queries. The query set may include hundreds or thousands of queries for testing that are provided from the production environment, e.g., from search stack subsystem 140 of FIG. 1. In order to perform the SxS testing, the system stages a server with the change and runs the queries on an unchanged server and the changed server, or may run the queries on the unchanged server then stage the server with the change and run the queries again. If the feature is new and lacks anything to compare against, the system may obtain a list of outputs for the new feature, and examine their results. In some implementations, the system may generate statistics on how many query results change between the comparisons.

Once the system has produced results from the unchanged and the changed server, the system may estimate the impact of the change (615). For example, the system may determine how much production traffic might be affected by this change. To estimate the impact, the system may enable a human to review a few dozen of the differences manually. This enables a human to ensure that the changes are behaving as expected, and their overall effect is desired. The system may include a user interface that enables a human reviewer to view side-by-side comparison of query and result pairs. If the traffic impact is small but the results look obviously positive (620, Yes), the change may be launched, but its reverse added to a holdback environment (625). A holdback environment is a production environment that lacks the launched changes. In other words, the holdback environment is a copy of the production environment before the changes are pushed to the production environment. The holdback environment may be hosted on a single production server of a plurality of production servers. Thus, once the change is pushed to the production environment (630), the holdback environment may operate on a small fraction of traffic (635). This enables the system to measure the overall effect of the change(s) over a period of time and to offer a faster way to revert the changes should the monitoring over time reveal undesirable or unwanted effects. In some implementations, the holdback environment may reset periodically, e.g., at the beginning of each quarter.

If the change of the quality is subtle and hard to spot check (620, No), the evaluation and monitoring subsystem may calculate a metric for the signal based on crowd-source tasks (640). For example, the system may provide results to human evaluation, e.g., using crowd sourcing component 125 of FIG. 1. The crowd sourcing tasks may ask the evaluator to compare side by side results. In some implementations, the system may run the change in one or in multiple configurations and send all results to a human to judge via crowd sourcing. The system may compute a metric (like NDCG or CRAP) to measure the difference based on the crowd sourcing tasks.

The system may determine, based on the metric, whether additional testing is needed (645). If the traffic impact is small but human evaluation results are very positive (645, No), the feature may be launched and added to the holdback environment (625). If the traffic impact is not small (e.g., >1%) or the human judgement from review of results by a user for via crowd sourcing tasks is unclear about the subtly of the change, or if there is a UI change that may affect user behavior, or a reasonable suspicion that the core metrics may be affected exists (645, Yes), a experiment may be run using an experimentation system, such as DDG (650). To avoid wash-out effect in the experiment, in some implementations, only users actually affected by the change may be selected for the experiment bucket; and same for the control bucket, e.g., only selecting those that could be otherwise affected. This may not be feasible all the time. The bucket size may be a few million affected users in each bucket to tell the change confidently. Based on the results, the system, Returning to FIG. 1, the evaluation and monitoring subsystem 120 may include a metrics dashboard 124 to continuously monitor the performance of the system. The metrics dashboard 124 may compute metrics from various sources. For example, some metrics may be computed from human evaluations 121 collected from a Crowd Sourcing component 125. The dashboards 124 may be based on scores, e.g., NDCG or CRAP scores, for several product features, e.g., TWEET search, news search (news gallery), user search, media search, spelling correction, type-ahead, etc. These evaluations may be run automatically and periodically. Another source for the metrics dashboard 124 is logs, such as running scalding jobs, to process logs and extract metrics, running real-time data stream processing jobs over log events and computing some metrics in real-time.

Figure 7:
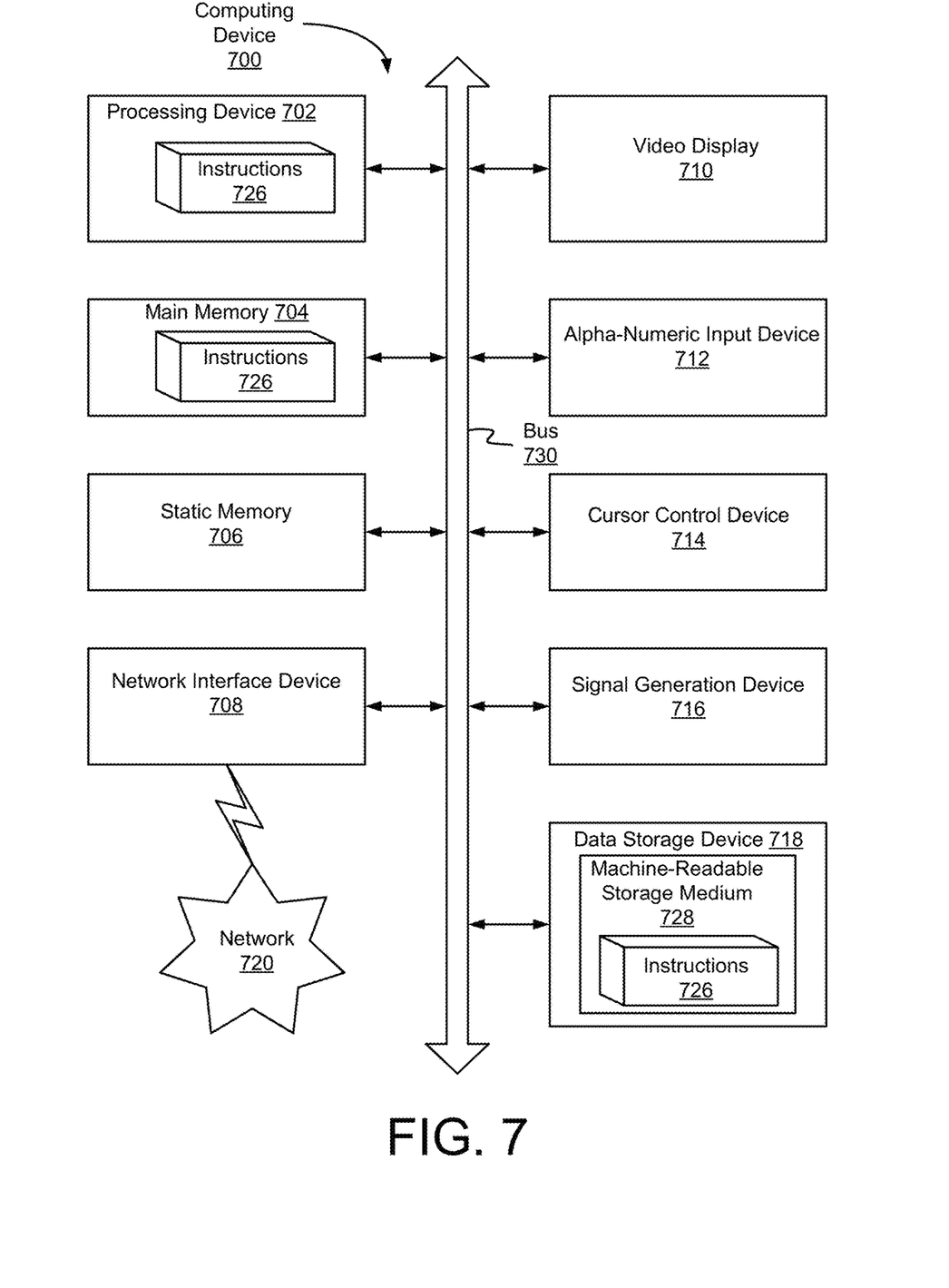
FIG. 7 is a is a schematic diagram of a machine in the example form of a computing device within which a set of instructions, for causing the machine to perform any one or more of the functions described herein, according to an implementation.

FIG. 7 illustrates a diagrammatic representation of a machine in the example form of a computing device 700 within which a set of instructions, for causing the machine to perform any one or more of the methodologies discussed herein, may be executed. The computing device 700 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In one implementation, the computing device 700 may present an overlay UI to a user (as discussed above). In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 700 includes a processing device (e.g., a processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)) and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 (e.g., instructions for an application ranking system) for performing the operations and steps discussed herein.

The computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and a signal generation device 716 (e.g., a speaker). In one implementation, the video display unit 710, the alphanumeric input device 712, and the cursor control device 714 may be combined into a single component or device (e.g., an LCD touch screen).

The data storage device 718 may include a computer-readable storage medium 728 on which is stored one or more sets of instructions 726 (e.g., instructions for the application ranking system) embodying any one or more of the methodologies or functions described herein. The instructions 726 may also reside, completely or at least partially, within the main memory 704 and/or within the processing device 702 during execution thereof by the computing device 700, the main memory 704 and the processing device 702 also constituting computer-readable media. The instructions may further be transmitted or received over a network 720 via the network interface device 708.

While the computer-readable storage medium 728 is shown in an example implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media. The term "computer-readable storage medium" does not include transitory signals.

In the above description, numerous details are set forth. It will be apparent, however, to one of ordinary skill in the art having the benefit of this disclosure, that implementations of the disclosure may be practiced without these specific details. Moreover, implementations are not limited to the exact order of some operations, and it is understood that some operations shown as two steps may be combined and some operations shown as one step may be split. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

What is claimed is:

1. A method comprising:
   generating a snapshot of a production search environment, the search environment using a plurality of signals to generate a search result provided to a client;
   performing testing of a signal or index change in the snapshot;
   estimating an impact of the change based on the testing;
   determining, based on the estimate, whether the impact is positive; and
   responsive to determining the impact is not positive:
      generating crowd-source tasks based on testing,
      calculating a metric based on results of the crowd-source tasks,
      determining, based on the metric, results are positive, and
      responsive to determining the results are positive:
         generating a holdback environment of the production search environment, the holdback environment being a portion of the production search environment selected not to receive the change,
         pushing the change to the production search environment, and
         monitoring the change by running partial production traffic through the holdback environment.

2. The method of claim 1, wherein the snapshot includes a partial capture of production data.

3. The method of claim 1, wherein the snapshot includes a partial capture of production data that represents a pre-defined number of days.

4. The method of claim 1, wherein the testing is AB testing.

5. The method of claim 4, further comprising, responsive to determining the impact is not positive:
   determining, based on the metric, results are not positive;
   providing the change to an experimentation system; and
   responsive to determining results from the experimentation system are positive:
      generating the holdback environment,
      pushing the change to the production search environment, and
      monitoring the change by running partial production traffic through the holdback environment.

6. The method of claim 1, wherein a change affecting more than 2% of traffic is not positive.

7. The method of claim 1, wherein the change is a new index field for retrieval.

8. The method of claim 7, wherein generating the snapshot includes:
   receiving a map from a document to the new index field;
   extracting the information from the document according to the map; and
   generating an index in the snapshot that includes the new index field.

9. The method of claim 1, wherein the testing includes a query set of a pre-defined number of queries that are provided from the production search environment.

10. A system comprising:
    at least one processor,
    memory storing instructions that, when executed by the at least one processor cause the system to perform operations including:
       generating a snapshot of a production search environment, the search environment using a plurality of signals to generate a search result provided to a client;
       performing testing of a signal or index change in the snapshot;
       estimating an impact of the change based on the testing;
       determining, based on the estimate, whether the impact is positive; and
       responsive to determining the impact is not positive:
          generating crowd-source tasks based on testing,
          calculating a metric based on results of the crowd-source tasks,
          determining, based on the metric, results are positive, and
          responsive to determining the results are positive:
             generating a holdback environment of the production search environment, the holdback environment being a portion of the production search environment selected not to receive the change,
             pushing the change to the production search environment, and
    monitoring the change by running partial production traffic through the holdback environment.

11. The system of claim 10, wherein the snapshot includes a partial capture of production data.

12. The system of claim 10, wherein the snapshot includes a partial capture of production data that represents a pre-defined number of days.

13. The system of claim 10, wherein the testing is AB testing.

14. The system of claim 13, the memory further storing instructions that, when executed by the at least one processor, further cause the system to perform operations including, responsive to determining the impact is not positive:

determining, based on the metric, results are not positive;
providing the change to an experimentation system; and
responsive to determining results from the experimentation system are positive:
- generating the holdback environment,
- pushing the change to the production search environment, and
- monitoring the change by running partial production traffic through the holdback environment.

15. The system of claim 10, wherein a change affecting more than 2% of traffic is not positive.

16. The system of claim 10, wherein the change is a new index field for retrieval.

17. The system of claim 16, wherein generating the snapshot includes:
- receiving a map from a document to the new index field;
- extracting the information from the document according to the map; and
- generating an index in the snapshot that includes the new index field.

18. The system of claim 10, wherein the testing includes a query set of a pre-defined number of queries that are provided from the production search environment.

\* \* \* \* \*

UNITED STATES PATENT AND TRADEMARK OFFICE
CERTIFICATE OF CORRECTION

PATENT NO. : 10,489,284 B1
APPLICATION NO. : 15/676984
DATED : November 26, 2019
INVENTOR(S) : Saraf Page 1 of 1

It is certified that error appears in the above-identified patent and that said Letters Patent is hereby corrected as shown below:

In the Claims

In Column 16, Line 1, Claim 4, delete "AB" and insert -- A/B --, therefor.

In Column 16, Line 62, Claim 13, delete "AB" and insert -- A/B --, therefor.

Signed and Sealed this
Seventh Day of April, 2020

Andrei Iancu
*Director of the United States Patent and Trademark Office*